3,111,386
// PRODUCTION OF BORON HYDRIDES
// David Horvitz, Cincinnati, and Jawad H. Murib, St. Bernard, Ohio, assignors to National Distillers and Chemical Corporation, New York, N.Y., a corporation of Virginia
// No Drawing. Filed Apr. 28, 1959, Ser. No. 809,347
// 6 Claims. (Cl. 23—204)

The present invention relates to a novel process for the production of boron hydrides and, more particularly, to a process for the production of diborane.

In broad aspect, the process embodied herein relates to the production of boron hydrides by reaction with hydrogen at an elevated temperature of an oxygen-containing compound of boron in the presence of a substance, as defined more fully hereafter, that serves as a flux for the oxygen-containing boron compound. In a modification, the aforesaid process is carried out in the presence of aluminum in addition to said flux whereby the yield of the desired boron hydride or hydrides is unexpectedly and materially increased.

More specifically, the process embodied herein comprises contacting with hydrogen at an elevated temperature an oxygen-containing boron compound, examples of which include boron oxide, boron esters (e.g. methyl borate), alkali metal borates (e.g., $Na_2B_4O_7$) etc., in the presence of a fluxing agent, a particularly suitable example of which is sodium aluminum tetrachloride. For such a process for preparation of boron hydrides, the fluxing agent that is used should not be chemically reactive with boron hydrides, should be stable at temperatures in the range of about 350° C. to about 800° C. and liquid in that temperature range. Examples of substances for use to provide such fluxes including sodium aluminum tetrachloride, combinations of alkali and alkaline earth halides with aluminum chloride and with each other, which combinations melt within the aforesaid temperature range.

Thus, in general, the invention embodies for use as such a fluxing agent, in addition to combinations of alkali and alkaline earth chlorides or bromides which melt within the aforesaid range, a substance that is liquid and stable in the aforesaid temperature range and which has the following formula

wherein M is a metal from the group consisting of alkali and alkaline earth metals, X is a member from the group consisting of chlorine and bromine, and $n$ is the valence of the metal.

Where aluminum metal is used as a reactant, boron oxide may be used as both flux and reactant. Metal borates may also be added to such a flux.

The oxygen-containing boron reactant, such as boron oxide or a borate, need only be moderately soluble in the melt provided by the fluxing agent.

In carrying out the process, the volatile products of the reaction are removed as they are formed in the reaction mixture as, for example, by being swept out of the system by means of a gas. For such a purpose, excess hydrogen (over that necessary as a reactant) may be used as a purge gas. Other inert gases, such as nitrogen, helium, argon, and others can also be used.

The process is carried out with reactants that are substantially dry to minimize or obviate destruction of the product boron hydrides by moisture. Moreover, the hydrogen reactant should be substantially free or devoid of oxygen as the latter would combine with hydrogen in the hot reaction zone to form water; the oxygen-containing boron compound should preferably be pre-dried such, for example, as may be accomplished by heating same at 200–300° C. in a stream of dry nitrogen or under vacuum; and the material used as a flux preferably pretreated by heating in a dry gas stream.

The process embodied herein can be carried out by any of several procedures. Thus, for example, the hydrogen gas can be passed through or over (but in contact with) the melt or by bubbling the hydrogen gas concurrently up through a flowing stream of the melt. The contact time of the gas stream should be controlled in order to effect maximum yields of the desired boron hydride and to avoid or minimize the formation of metal borides, decomposition products of boron hydride, and boron metal. The contact time required for accomplishing such a result varies with the temperature employed and, in general, the higher the temperature, the smaller is the contact time requirements. At temperatures as low as about 200° C., the desired reaction generally proceeds rather slowly whereas, at temperatures up to about 1200° C., it proceeds rapidly; and, at high temperatures, there is a tendency for formation of undesired decomposition products. In preferred embodiment, the reaction is carried out at from about 375° C. to about 800° C.

Regarding time of contact, at a residence time on the order of about fifty seconds at the lower range of the aforesaid temperature, there is a tendency for formation of undesired decomposition products although boron hydrides are produced. At the higher temperatures, boron hydride formation occurs at residence times as low as 0.01 second. Thus, the process is generally carried out with a residence time of from about 0.02 to about 30 seconds and, preferably from about 0.05 to about five seconds.

Pressure is not a critical requirement for the process embodied herein as the process can be carried out at atmospheric, subatmospheric or superatmospheric pressure. However, it is preferred to employ atmospheric pressure, or slightly above, so as to facilitate separation of the product boron hydrides from the hydrogen.

The product boron hydrides may be separated from the reaction mixture by any suitable method, including those known to those skilled in the art. Thus, the effluent gas stream may be cooled to −196° C. by means of liquid nitrogen, thereby condensing out the boron hydrides and permitting the hydrogen to pass through for recycle in the process. The boron hydride can then be fractionally distilled to provide substantially pure boron hydrides, consisting mainly of diborane although small quantities of tetra- and penta-borane may be present.

When the process is practiced with added usage of free aluminum, the aluminum can be used in any of various forms as the particle size thereof does not appear to be critical. Thus, it may be used as a fine powder, coarse granules, etc. added to the reaction mixture, containing the oxygen-containing boron compound, prior to contact thereof with the hydrogen reactant.

In order to further describe the invention, several embodiments are set forth in the following examples for purposes of illustration and not limitation.

*Example 1*

Boron oxide (0.116 mole) was added to a 1:1 mole ratio of NaCl and $AlCl_3$. The mixture was heated in a quartz flask under argon until a melt of $NaAlCl_4$ was obtained. A flow of hydrogen gas at about 1 liter per minute was bubbled through the melt at a temperature of 500–700° C. and the effluent gas stream passed through traps cooled to −196° C. to condense out the reaction products. When the effluent hydrogen was burned, a green flame was obtained, thereby qualitatively showing the presence of boron hydrides. The heating was continued for four hours. Products condensed at −196° C. were examined by infrared spectroscopy and the presence of diborane was confirmed.

In three other runs, similar reactions were conducted except that Na₂B₄O₇ was used rather than boron oxide (B₂O₃). In one of those runs, 50 grams of Na₂B₄O₇ was added to a mixture of 117 grams NaCl and 266 grams AlCl₃. On passing hydrogen gas at a rate of about 1 liter per minute through the resulting melt at 275–500° C. the effluent gas reduced silver nitrate, as well as iodate solution, thereby evidencing the presence of boron hydrides.

*Example 2*

A 300 ml. flask equipped with a stirrer was fitted with a gas inlet tube and connected with a series of cooled traps which permitted the collection of the reaction products in the effluent gas stream. The flask was charged with 117 grams NaCl and 266 grams AlCl₃ and this mixture was heated to 320° C. while being stirred. To this melt was added 50 grams of Na₂B₄O₇ which had previously been dried under vacuum at 200° C. Oxygen-free nitrogen gas, dried by passing through a liquid nitrogen cooled trap, was passed through the melt for several hours at 350° C. to eliminate moisture. Finally, 33 grams of aluminum granules (about 40–60 mesh) were introduced into the melt, and the nitrogen gas was replaced with hydrogen gas. The feed hydrogen was initially passed through heated copper (to remove oxygen) and through a liquid nitrogen cooled trap (to remove moisture) before it entered the reaction. The hydrogen flow rate was set at 10 cc. per second, which in this system gave a residence time of 2–3 seconds. The temperature of the melt was maintained at 375–400° C. The production of boron hydrides was detected immediately by the reduction of silver nitrate and potassium permanganate solution exposed to the effluent gases. The product collected during a 30 hour period of reaction showed a yield of about 44% based on boron consumed and not directly recoverable.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for production of boron hydrides which consists of contacting with hydrogen as the sole reducing agent, at a temperature of from about 200 to about 1200° C. and for a residence time of from about 0.1 to about 30 seconds, an oxygen-containing compound of boron from the group consisting of boron oxide, boron esters and borates of alkali and alkaline earth metals in the presence of a fluxing agent that is chemically inert to boron hydrides and is stable and liquid at said temperature while removing as formed the volatile reaction products including boron hydrides from the reaction zone, said fluxing agent being selected from (1) compounds of the formula

$M(AlX_4)_n$ wherein M is a metal from the group consisting of alkali and alkaline earth metals, X is a member from the group consisting of chlorine and bromine, and $n$ is the valence of the metal, (2) mixtures of alkali and alkaline earth chlorides, and (3) mixtures of alkali earth metal bromides.

2. A process, as defined in claim 1, wherein the reaction is carried out at from about 375 to about 800° C.

3. A process for the production of boron hydrides which consists of contacting with hydrogen as the sole reducing agent, at a temperature of from about 350° to about 800° C. and for a residence time of about 0.01 to about 30 seconds, an oxygen-containing compound of boron selected from the group consisting of boron oxide, boron esters and borates of alkali and alkaline earth metals, in the presence of sodium aluminum tetrachloride as a fluxing agent, while removing as formed the volatile reaction products including boron hydrides from the reaction zone.

4. A process, as defined in claim 3, wherein the oxygen-containing boron compound is sodium borate.

5. A process for the production of boron hydrides which consists of contacting with hydrogen as the sole reducing agent, at a temperature of from about 350° to about 800° C. and for a residence time of about 0.01 to about 30 seconds, an oxygen-containing compound of boron selected from the group consisting of boron oxide, boron esters and borates of alkali and alkaline earth metals, in the presence of mixtures of aluminum trichloride and sodium chloride that are liquid and stable in the range of 350° to 800° C. as a fluxing agent, while removing as formed the volatile reaction products including boron hydrides from the reaction zone.

6. A process, as defined in claim 5, wherein the oxygen-containing compound is sodium borate.

References Cited in the file of this patent

UNITED STATES PATENTS

| | | |
|---|---|---|
| 2,864,671 | Mohlman | Dec. 16, 1958 |
| 2,875,028 | Winternitz | Feb. 24, 1959 |
| 2,888,327 | Adams | May 26, 1959 |
| 2,985,510 | Kalb | May 23, 1961 |
| 3,021,197 | Clark et al. | Feb. 13, 1962 |

FOREIGN PATENTS

| | | |
|---|---|---|
| 1,054,081 | Germany | Apr. 2, 1959 |
| 832,049 | Great Britain | Apr. 6, 1960 |

OTHER REFERENCES

Hurd: "Journal of the American Chemical Society," volume 71, pages 20–22 (January 1949).

Hurd: "Chemistry of the Hydrides," 1952, pages 64–65.

Taylor: "Inorganic and Theoretical Chemistry," 9th edition, 1952, pages 148–149.